Feb. 3, 1953 — S. E. HOTCHKISS — 2,627,120
SPACER GAUGE FOR ADJUSTABLE ROLLER BEARINGS
Filed Nov. 15, 1950
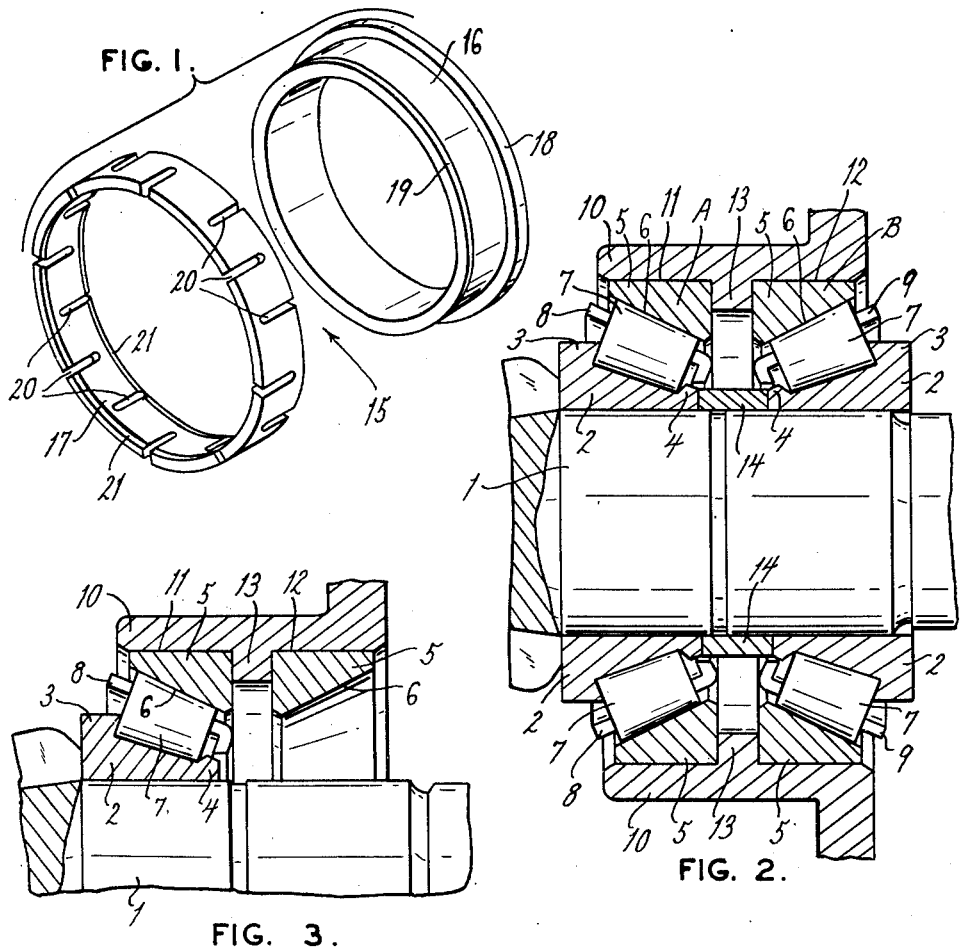
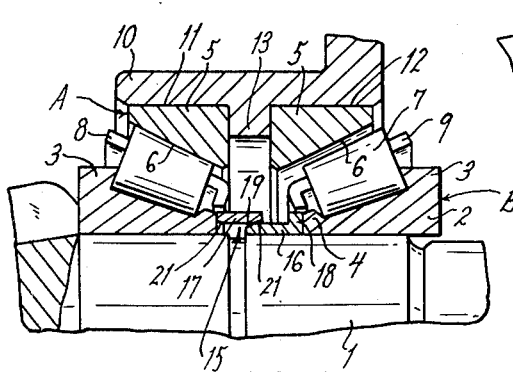
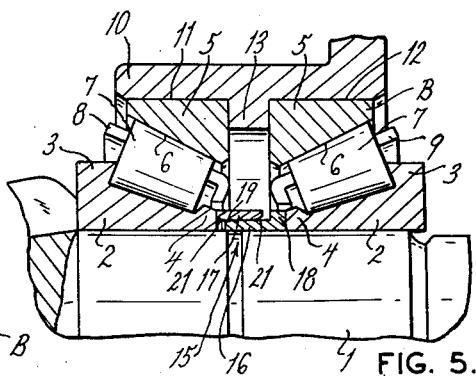
INVENTOR.
SIDNEY E. HOTCHKISS
BY
Carr & Carr & Gravely,
ATTORNEYS Patented Feb. 3, 1953

2,627,120

UNITED STATES PATENT OFFICE 2,627,120

SPACER GAUGE FOR ADJUSTABLE ROLLER BEARINGS

Sidney E. Hotchkiss, Pontiac, Mich., assignor to The Timken Roller Bearing Company, Canton, Ohio, a corporation of Ohio Application November 15, 1950, Serial No. 195,769

10 Claims. (Cl. 33—181)

This invention relates in general to roller bearings adjustable for a desired preload and, more particularly, to a spacer gauge therefor.

To assure the smooth running of roller bearings with even distribution of load, it is necessary in certain applications to preload the bearings to effect a deflection of the load carrying elements equivalent to those imposed by the radial and thrust loads. Inasmuch as there will be a fixed relationship between the particular preload and the deflection effected thereby, a certain spaced relationship between the bearing cones will correspond with a particular preload.

Therefore, it is the principal object of the present invention to provide a spacer gauge for accurately determining the proper spacial relationship between the cones of adjustable roller bearings corresponding to a selected degree of prestressing thereof.

It is a further object of the present invention to provide a spacer gauge adapted for contraction to an over-all width determined by a preliminary preloading operation.

It is an additional object of the present invention to provide a spacer gauge of two-part construction having inner and outer rings adapted for telescopic movement and spring-like retentive engagement with each other.

It is a still further object of the present invention to provide a spacer gauge which is reliable and durable in usage and economic in construction.

With the above and other objects in view, my invention resides in the novel features of form, construction, arrangement, and combination of parts presently described and pointed out in the claims.

This invention consists principally in a spacer gauge having a normally inner, rigid ring and a normally outer, resilient ring, the latter being diametrally dimensioned for tight fitting about the inner ring, whereby upon disposition of the gauge upon a pinion shaft, or the like, between the roller bearings, the same may be telescoped under axially directed preloading force applied to the bearing cones so that upon release of said force, the resulting over-all width of the gauge will equal the width of the spacer to be used in the bearing assembly for the particular preload.

In the accompanying drawing, wherein like reference characters refer to like parts wherever they occur:

Figure 1 is a perspective, exploded view of a spacer gauge constructed in accordance with and embodying the present invention;

Figure 2 is a fragmentary longitudinal sectional view of a preloaded pinion roller bearing mounting with a spacer member of predetermined width; and Figures 3, 4 and 5 are fragmentary, longitudinal sectional views illustrating in sequence the steps in the use of the spacer gauge.

Referring now to the drawing which illustrates a preferred embodiment of the present invention, 1 designates a propeller or pinion shaft of an automotive driving axle construction and the like, being of the type rotatably supported by a pair of axially spaced, preloaded, single-row tapered roller bearings A and B which are in indirect relation having a short bearing center. Each of the bearings A and B comprises a cone or inner bearing member 2 clamped or otherwise rigidly fixed on the pinion shaft 1 and integrally provided at its larger end with a thrust rib 3 and at its opposite end with a retaining rib 4, a cup or outer bearing member 5 having a conical raceway 6, and tapered rollers 7 interposed therebetween. Maintaining the rollers 7 of each of the bearings A and B in proper running position are cages 8 and 9, respectively. Disposed encirclingly about the bearings A and B for retentive engagement therewith is a cup carrier 10 internally contoured to form cup seats 11 and 12 which are separated by a medial flange 13 for maintaining the cups 5 of the bearings A and B in relative position to each other. Mounted on the pinion shaft 1 between, and abutting against, the cones 2 of the bearings A and B is an annular spacer 14 having a width predetermined by the requisite cone spacing under the particular preload applied to the bearings A and B.

Provided for accurately determining the requisite width of the spacer 14 for such preload, is a spacer gauge or measuring unit 15 of two-part construction comprising normally inner and normally outer rings or annular members 16 and 17. The inner ring 16 is rigid, being fabricated preferably of hardened steel, and has an interior diameter slightly in excess of that of the pinion shaft 1 whereby it may be relatively freely slipped thereon. At one of its ends the inner ring 16 is provided with a backing flange 18 substantially equivalent in width to the end face of the cones 2 adjacent the retaining ribs 3 for abutment thereagainst, for reasons to be described hereinafter and adjacent its other end said ring 16 is chamfered on its outer face to provide a beveled surface 19. The ring 17, which is normally the outer ring, is fabricated preferably of steel heat-treated to relatively stiff resiliency, with increased expansibility being provided by a plurality of uniformly spaced, elongated recesses or slots 20 disposed throughout the circumference of the ring 17 and alternately extending from the opposite end margins thereof with their inner, closed ends terminating, in, turn, on opposed sides of the medial circumference of the ring 17. The interior diameter of the outer ring 17 is slightly less than the exterior diameter of the inner ring 16 so that under considerable pressure the outer ring 17 through its elasticity may be forced telescopic-wise about the outer face of the inner ring 16. The end faces of the outer ring 17 are beveled as at 21 complementally to the beveled surface 19 of the inner ring 16 for camming engagement therebetween for facilitating the initial jointure of the rings 16 and 17 for subsequent relative movement therebetween. Such relative movement is ultimately limited by abutment of the outer ring 17 against the backing flange 18. The exterior diameter of the outer ring 17 is equivalent to that of the backing flange 18 so that the respective peripheral faces thereof will be flush upon maximum contraction of the gauge 15.

By referring to Figures 3, 4, and 5, the operation of the spacer gauge 15 will become apparent. The pinion shaft 1 is suitably clamped for stationary disposition and the cone 2 of the bearing A, with its associated rollers 7, is pressed into fixed position thereon. The cup carrier 10 with the cups 5 of both bearings A and B retained therein is then installed upon the pinion shaft 1, all as may best be seen in Figure 3. The spacer gauge 15, with its inner and outer rings 16 and 17, in extended relation so as to have an overall width greater than the maximum distance between the cones 2 of the respective bearings A and B, is slipped upon the pinion shaft 1 with the backing flange 18 being presented outwardly. With the gauge 15 thus in place, the cone 2 with the associated rollers 7 of the bearing B is then disposed upon the shaft 1 with the end face adjacent its thrust rib 3 brought into abutment with, or in proximate relation to, the backing flange 18 as shown in Figure 4. By conventional means, axially directed pressure is slowly applied against the outer or back face of the cone 2 of the bearing B with rotation being imparted simultaneously to the cup carrier 10 by a customary torque measuring device (not shown). As the pressure is developed, relative movement will be effected between the inner and outer rings 16 and 17 causing the gauge 15 to telescope or contract. The application of the pressure is continued until the desired torsional resistance is reached, as indicated by the torque measuring device. Thereupon, the requisite spacial relationship between the cones 2 of the bearings A and B will have been determined for the particular preload to be applied (see Figure 5).

The cone 2 of the bearing B is then removed from the pinion shaft 1 and the spacer gauge 15 is taken off with the inner and outer rings 16 and 17 securely engaged in their ultimate telescoped relation.

The over-all width of the removed gauge 15 is measured and a spacer 14 of equivalent width is selected from stock and mounted upon the pinion shaft 1. The cone 2 of the bearing B is then replaced and the remaining steps in the assembly are taken with the certainty that the preloading of the bearings A and B will be in desired degree, since axial relative movement of the cones 2 during assembly will be limited by their abutment against the spacer 14.

The fit of the inner and outer rings 16 and 17 is such as to require substantial force to effect their progressive telescoping to the final width; and there shall be a correspondingly great spring-like retention between them. Therefore, the final width of the spacer gauge 15 will accurately measure the necessary width of the spacer 14.

It should be understood that changes and modifications in the form, construction, arrangement, and combination of the several parts of the spacer gauge for adjustable roller bearings may be made and substituted for those herein shown and described without departing from the nature and principle of the present invention.

What I claim is:

1. A spacer gauge for determining the distance between the cones of adjustable roller bearings under a selected preload; comprising an inner relatively rigid annular member, and an outer relatively resilient annular member, said inner and outer annular members being adapted for relative telescopic positioning responsive to the application of such selected preload.

2. A spacer gauge for determining the distance between the cones of adjustable roller bearings under a selected preload when the bearings are mounted on a shaft in close spaced relationship; comprising an inner annular member, and an outer annular member, said outer annular member having an interior diameter less than the exterior diameter of the inner annular member and being expansible, said members containing interengaging camming means, whereby upon the application to one of the bearing cones of an axial force equivalent to such selected preload the outer annular member will expand for telescopic positioning with relation to the inner annular member.

3. A spacer gauge for determining the distance between the cones of adjustable roller bearings under a selected preload when the bearings are mounted on a shaft in close spaced relationship; comprising an inner annular member, and an outer annular member, said outer annular member having an interior diameter less than the exterior diameter of the inner annular member and being expansible, said members containing interengaging camming means, whereby upon the application to one of the bearing cones of an axial force equivalent to such selected preload the outer annular member will expand for telescopic positioning with relation to the inner annular member, said inner annular member being provided at one end with a flange for abutment with the outer annular member to limit the telescoping movement thereof.

4. An assembly for determining the required spacing between bearing cones under selected preload conditions, comprising a shaft having a pair of roller bearings adjustably mounted thereon in opposed spaced relationship, said bearings including bearing cones and bearing cups; means maintaining the bearing cups in selected spaced relationship; and a spacer gauge disposed about the shaft between the bearing cones, said gauge including an inner rigid annular member, and an outer expansible annular member mounted thereon for expanding telescoping movement therewith; the bearing cones being movable relatively inwardly when subjected to opposed external forces to achieve the selected preload conditions whereby the members of the spacer gauge are telescoped under pressure to the required length for said conditions.

5. An assembly for determining the required spacing between bearing cones under selected preload conditions, comprising a shaft having a pair of roller bearings adjustably mounted thereon in opposed spaced relationship, said bearings including bearing cones and bearing cups; means maintaining the bearing cups in selected spaced relationship; and a spacer gauge disposed about the shaft between the bearing cones, said gauge including an inner rigid annular member, and an outer annular member with opposed end faces mounted thereon for telescoping movement therewith, the outer member having a normal inside diameter less than the outside diameter of the inner member and containing a series of spaced notches in the end face adjacent the inner member to permit a limited expansion of the outer member adjacent said face; the bearing cones being movable relatively inwardly to achieve the selected preload conditions whereby the members of the spacer gauge are telescoped under pressure to the required length for said conditions.

6. The method of determining the required spacing between the bearing cones of opposed roller bearings under selected preload conditions, comprising the steps of adjustably positioning roller bearings containing bearing cups and cones on a shaft in opposed spaced relationship with a telescoping spacer gauge between the bearing cones; and moving the bearing cones relatively inwardly on the shaft while maintaining the bearing cups in predetermined spaced relationship until the desired preload conditions are achieved, whereby the spacer gauge is telescoped to the required length for maintaining the desired preload conditions.

7. The method of determining the required spacing between the bearing cones of opposed roller bearings under selected preload conditions, comprising the steps of mounting a first roller bearing including a bearing cup and a bearing cone on a shaft; positioning an annular telescoping spacer gauge about the shaft adjacent the cone of said bearing; positioning a second bearing including a bearing cup and a bearing cone on the shaft adjacent the first bearing in opposed relationship; and forcing the bearing cones relatively inwardly on the shaft while maintaining the bearing cups in predetermined spaced relationship until the desired preload conditions are achieved, whereby the spacer gauge is telescoped to the required length for maintaining the desired preload conditions.

8. The method of determining the required spacing between the bearing cones of opposed roller bearings under selected preload conditions, comprising the steps of adjustably positioning roller bearings containing bearing cups and cones on a shaft in opposed spaced relationship with a telescoping spacer gauge between the bearing cones; moving the bearing cones relatively inwardly on the shaft while maintaining the bearing cups in predetermined spaced relationship until the desired preload conditions are achieved, whereby the spacer gauge is telescoped to the required length for maintaining the desired preload conditions; and replacing the telescoped spacer gauge with a rigid annular member having the same length.

9. The method of determining the required spacing between the bearing cones of opposed roller bearings under selected preload conditions, comprising the steps of mounting a first roller bearing cone on a shaft with said cone having a pair of bearing cups associated therewith and maintained in opposed relationship a selected distance apart; positioning an annular telescoping spacer gauge about the shaft adjacent the first bearing cone; positioning a second bearing cone and roller bearings on the shaft adjacent the spacer gauge; and forcing the second bearing cone toward the first cone while limiting the movement of the latter until the desired preload conditions are achieved, whereby the spacer gauge is telescoped to the required length for maintaining the desired preload conditions.

10. The method of determining the required spacing between the bearing cones of opposed roller bearings under selected preload conditions, comprising the steps of mounting a first roller bearing cone on a shaft with said cone having a pair of bearing cups associated therewith and maintained in opposed relationship a selected distance apart; positioning an annular telescoping spacer gauge about the shaft adjacent the first bearing cone; positioning a second bearing cone and roller bearings on the shaft adjacent the spacer gauge; forcing the second bearing cone toward the first cone while limiting the movement of the latter until the desired preload conditions are achieved, whereby the spacer gauge is telescoped to the required length for maintaining the desired preload conditions; removing the second bearing cone and roller bearings; replacing the telescoped spacer gauge with a rigid annular member having the same length; and returning the second bearing cone and rollers to their original position on the shaft.

SIDNEY E. HOTCHKISS.

REFERENCES CITED

The following references are of record in the file of this patent:

UNITED STATES PATENTS

| Number | Name | Date |
|---|---|---|
| 1,299,627 | Simon | Apr. 8, 1919 |
| 1,729,286 | Elfring | Sept. 24, 1929 |
| 2,527,988 | Dillon | Oct. 31, 1950 |
| 2,565,759 | Danly | Aug. 28, 1951 |